United States Patent
Bates et al.

(10) Patent No.: US 8,458,665 B2
(45) Date of Patent: Jun. 4, 2013

(54) DEBUGGER WITH AUDIATION

(75) Inventors: Cary L. Bates, Rochester, MN (US); Christopher A. Peterson, Rochester, MN (US); Joseph M. Vaillancourt, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 1042 days.

(21) Appl. No.: 12/473,448

(22) Filed: May 28, 2009

(65) Prior Publication Data

US 2010/0306744 A1 Dec. 2, 2010

(51) Int. Cl.
*G06F 9/44* (2006.01)

(52) U.S. Cl.
USPC ......... 717/124; 717/125; 717/135; 717/127; 717/128; 714/38.1; 714/38.13

(58) Field of Classification Search
USPC ...... 717/124–129, 131–135; 714/38.1–38.14; 704/1–10
See application file for complete search history.

(56) References Cited

U.S. PATENT DOCUMENTS

| | | | | |
|---|---|---|---|---|
| 5,293,385 A | * | 3/1994 | Hary | 714/38.13 |
| 6,064,409 A | * | 5/2000 | Thomsen et al. | 715/700 |
| 6,240,376 B1 | * | 5/2001 | Raynaud et al. | 703/15 |
| 2004/0031019 A1 | * | 2/2004 | Lamanna et al. | 717/125 |
| 2004/0176952 A1 | * | 9/2004 | Fado et al. | 704/233 |
| 2008/0168428 A1 | * | 7/2008 | Bates et al. | 717/129 |
| 2012/0096434 A1 | * | 4/2012 | Rama | 717/120 |

OTHER PUBLICATIONS

Stefik et al., WAD: A Feasibility study using the Wicked Audio Debugger, Jul. 2007.*
Jessica R. Weinstein et al., "FAUST: A Framework for Algorithm Understanding and Sonification Testing," Online—http://www.icad.org/websiteV2.0/Conferences/ICAD97/Weinstein.pdf, 1997.
CG087—Time-based Multimedia Assets 3, "Sound as a communication medium: Auditory display, sonification, auralisation, earcons, & auditory, icons," pp. 19-56, 2005.
Chapter 2—"Sound in human-computer interaction," pp. 10-39, 1999.

* cited by examiner

*Primary Examiner* — Lewis A Bullock, Jr.
*Assistant Examiner* — Tina Huynh
(74) *Attorney, Agent, or Firm* — James R. Nock (57) ABSTRACT

A method and computer program product are provided for audiating the occurrence of debugger events within a software debugger. The method begins by assigning a sound characteristic to a debugger event occurring within a software program under debug. Next, the audiation of the sound characteristic associated with the event is optimized to maximize performance of the debugger. Finally, the optimized sound characteristic associated with the event is played upon the occurrence of the event.

16 Claims, 5 Drawing Sheets

```
|                    AUDIATION                          |
| EVENT  [VARIABLE CHANGE ▽]  VAR NAME [    i      ▽]   |
|  322           324                         404        |
| TONE   [TEXT-TO-SPEECH  ▽]                            |
|  326                                                  |
| DURATION   ○ LONG   ● MEDIUM   ○ SHORT                |
|  330                                                  |
| PRIORITY   ○ HIGH   ● MEDIUM   ○ LOW                  |
|  332                                                  |
```

```
|                    AUDIATION                          |
| EVENT  [VAR THRESHOLD ▽]  VAR NAME [    i      ▽]     |
|  322           324                         404        |
| TONE   [TEXT-TO-SPEECH  ▽]                            |
|  326                                                  |
| CONDITION [ EQUALS  ▽]  VALUE  [   1000   ]           |
|  422                                    424           |
| DURATION   ○ LONG   ● MEDIUM   ○ SHORT                |
|  330                                                  |
| PRIORITY   ○ HIGH   ● MEDIUM   ○ LOW                  |
|  332                                                  |
```

```
|                    AUDIATION                          |
| EVENT  [ RT LIB CALL ▽]  TONE  [ RT LIB TONE  ▽]      |
|  322           324                      326           |
| DURATION   ○ LONG   ● MEDIUM   ○ SHORT                |
|  330                                                  |
| PRIORITY   ○ HIGH   ● MEDIUM   ○ LOW                  |
|  332                                                  |
```

FIG. 4C

AUDIATION — 500

| EVENT | MULTITHREADING ▽ | TONE | DEFAULT ▽ |

- 322 ENABLE ● YES  ○ NO — 324
- 502 CHANNELS ○ 2CH  ○ 4CH  ● 5CH
- 504 DURATION ○ LONG  ● MEDIUM  ○ SHORT
- 330 PRIORITY ○ HIGH  ● MEDIUM  ○ LOW
- 332

FIG. 5A

AUDIATION — 550

EVENT [ MODULE ▽ ]   MODULE [ XYZ ▽ ]
 322                334    352

TONE [ DEFAULT ▽ ]
 326                354

Dropdown: ABC, DEF, HIJ, KLM, NOP

Module XYZ

```
 9   Result = malloc(100);
10   StrPtr = Result;
11   sprintf(StrPtr," %05X ",Offset);
12   StrPtr += 12;
13   i= 0
```

FIG. 5B

DEBUGGER WITH AUDIATION

BACKGROUND OF THE INVENTION

1. Field of the Invention

The field of the invention is data processing, or, more specifically apparatus and methods for debugger audiation.

2. Description of Related Art

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises at least one central processing unit (CPU) and supporting hardware, such as communications buses and memory, necessary to store, retrieve and transfer information. It also includes hardware necessary to communicate with the outside world, such as input/output controllers or storage controllers, and devices attached thereto such as keyboards, monitors, tape drives, disk drives, communication lines coupled to a network, etc. The CPU or CPUs are the heart of the system. They execute the instructions which comprise a computer program and direct the operation of the other system components.

The overall speed of a computer system is typically improved by increasing parallelism, and specifically, by employing multiple CPUs (also referred to as processors). The modest cost of individual processors packaged on integrated circuit chips has made multiprocessor systems practical, although such multiple processors add more layers of complexity to a system.

From the standpoint of the computer's hardware, most systems operate in fundamentally the same manner. Processors are capable of performing very simple operations, such as arithmetic, logical comparisons, and movement of data from one location to another. But each operation is performed very quickly. Sophisticated software at multiple levels directs a computer to perform massive numbers of these simple operations, enabling the computer to perform complex tasks. What is perceived by the user as a new or improved capability of a computer system is made possible by performing essentially the same set of very simple operations, using software having enhanced function, along with faster hardware.

A programmer develops a software program by producing and entering source code into files using a text editor program. The computer then creates an executable program by translating the source code into machine code. The machine code is the rudimentary instructions understood by the computer. Illustratively, the foregoing software development process is accomplished by running a series of programs. These programs include a compiler for translating the source code into machine code and a linker to link the machine code together to form a program.

An important aspect of the design and development of a computer program is a process known as "debugging". Debugging involves testing and evaluating the software to find and correct any errors and improper logic operations. Typically, a programmer uses another computer program commonly known as a debugger to debug a program under development. An effective debugger program is necessary for rapid and efficient development of software and typically provides functions including breakpoints, run-to-cursor, step into, step over, and the like.

A conventional debugging system comprises a combination of computer hardware and debugger software that executes a user's program in a controlled manner. Debugging aids a user in identifying and correcting mistakes in an authored program by allowing the program to be executed in small segments.

A debugging environment typically involves multiple windows on multiple screens which dynamically update as a developer steps through a program execution sequence and visually observes results. By way of example, there might be a source window containing the source code for the program being debugged, a watch window for displaying the current state of variety of program variables as the program executes, a console window for interacting with the running program, and a command window for providing a detailed history of each DLL and EXE file that has been loaded and executed. Any number of other windows may also be present, such as a disassembly window, register window, memory window, etc.

Visualizing the vast array information displayed on the multitude of windows during a typical debugging session can be a truly daunting task for those individuals having various degrees of visual impairments. Various mechanisms exist in the art to compensate for visual impairments to provide at least some degree of function to at least some visually impaired individuals. For example, for certain individuals with mild visual impairments, an output display of a digital device can be programmed to display information in a magnified form, or using special fonts, colors, or other characteristics, to make it easier for the visually impaired user to see.

As useful as these conventional mechanisms are, in general visually impaired individuals remain at a disadvantage vis-à-vis people of normal vision when it comes to using many textually intensive computer applications such as debuggers.

The large volumes of frequently changing text and data displayed during such sessions often necessitate small font sizes within the display windows, since several windows must be simultaneously displayed. Thus, magnifying characters within the display will come at the expense of the amount of information displayed. Since the information within the debugger windows is so dynamic, it is also cumbersome to constantly zoom in and zoom out in order to visualize the information displayed.

A need therefore exists for continued improvement to the way in which visually impaired persons interface with text and data intensive computer applications such as debuggers, and in particular to the way in which information from such a computer application is conveyed to a visually impaired user.

SUMMARY OF THE INVENTION

A method, apparatus, and computer program product are provided for audiating the occurrence of debugger events within a software debugger. The method begins by assigning a sound characteristic to a debugger event occurring within a software program under debug. Next, the audiation of the sound characteristic associated with the event is optimized to maximize performance of the debugger. Finally, the optimized sound characteristic associated with the event is played upon the occurrence of the event.

In one embodiment, the step of assigning a sound characteristic to a debugger event occurring within a software program under debug further includes: assigning a different tone to each module of the software program under debug; assigning a different pitch to each line within each module of the software program under debug; and associating a sound hook with each line within each module of the software program under debug such that the sound hook is played when each line is encountered during the debug operation. In an embodiment, an additional step of associating a sound hook with each module such that when a user moves a screen pointer over the module in edit mode, the sound hook is played.

In an embodiment, a sound hook is associated with a variable value residing within the software program under debug such that if the variable changes, the sound hook audiates the variable value change. In one instance, this is done via a text-to-speech sound hook. In another embodiment, a sound hook is associated with a point of interest residing within the software program under debug such that if the point of interest is reached during the debug operation, the sound hook audiates the occurrence of the event. In one instance, this is done via a text-to-speech sound hook.

In an embodiment, the present invention monitors the amount of time spent editing each of the modules, then adjusting the volume of the sounds hooks associated with each of the modules during debug based on the amount of time spent editing each of the modules. In another embodiment, if the software program comprises multiple threads, each thread is associated with a sound channel to indicate simultaneous activity among the multiple threads using special separation between stereo channels.

In one embodiment of the present invention, the step of optimizing the audiation of the sound characteristic associated with the event to maximize performance of the debugger further comprises: if a first sound hook is encountered during debug, determining the amount of time required to play the sound hook; and if a second sound hook is encountered during the time when the first sound hook is playing, pruning the playing of the second sound hook. In one embodiment, if a second sound hook is encountered during the time when the first sound hook is playing, pruning the playing of the second sound hook, a priority is assigned to each sound hook within the software program under debug. If a second sound hook is encountered during the time when the first sound hook is playing, pruning the playing of the second sound hook occurs only if the priority assigned to the second sound hook is less than or equal to the priority assigned to the first sound hook.

The foregoing and other features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
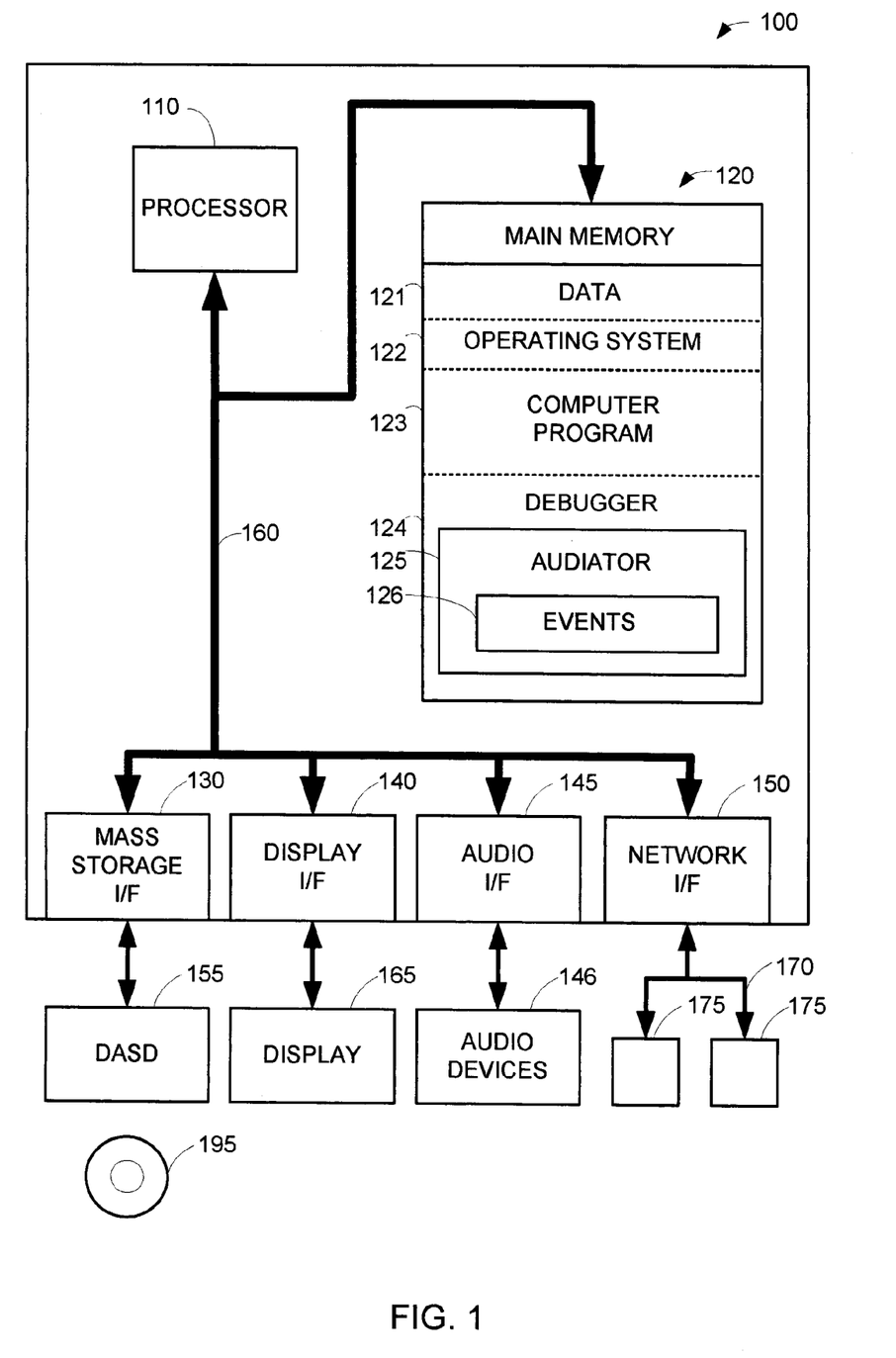
FIG. 1 sets forth a block diagram of an apparatus in accordance with the embodiments of the present invention.

Referring to FIG. 1, a computer system 100 is one suitable implementation of an apparatus in accordance with embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD RW drive, which may store data to and read data from a CD RW 195.

Main memory 120 in accordance with the preferred embodiments contains data 121, an operating system 122, a computer program 123, and a debugger 124. Data 121 represents any data that serves as input to or output from any program in computer system 100. Operating system 122 is a multitasking operating system known in the industry as i5/OS™; however, those skilled in the art will appreciate that the spirit and scope of the present invention is not limited to any one operating system. Program 123 represents any computer software that may optionally include multiple threads of execution. Debugger 124 includes an audiator 125 that audiates events occurring within the debugger 124 according to one or more user-specified events 126.

Computer system 100 utilizes well known virtual addressing mechanisms that allow the programs of computer system 100 to behave as if they only have access to a large, single storage entity instead of access to multiple, smaller storage entities such as main memory 120 and Direct Access Storage Device (DASD) 155. Therefore, while data 121, operating system 122, computer program 123, and debugger 124 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiments each include separate, fully programmed microprocessors that are used to off-load compute-intensive processing from processor 110. However, those skilled in the art will appreciate that the present invention applies equally to computer systems that simply use I/O adapters to perform similar functions, among other audible signals produced by computer system 100.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require the display 165, because all needed interaction with users and other processes may occur via network interface 150.

Audio interface 145 is used to directly connect one or more audio devices 146 to computer system 100. These audio devices 146 are used to allow system administrators and users of computer system 100 to hear the audiation produced by debugger events in accordance with the present invention.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

Figure 2:
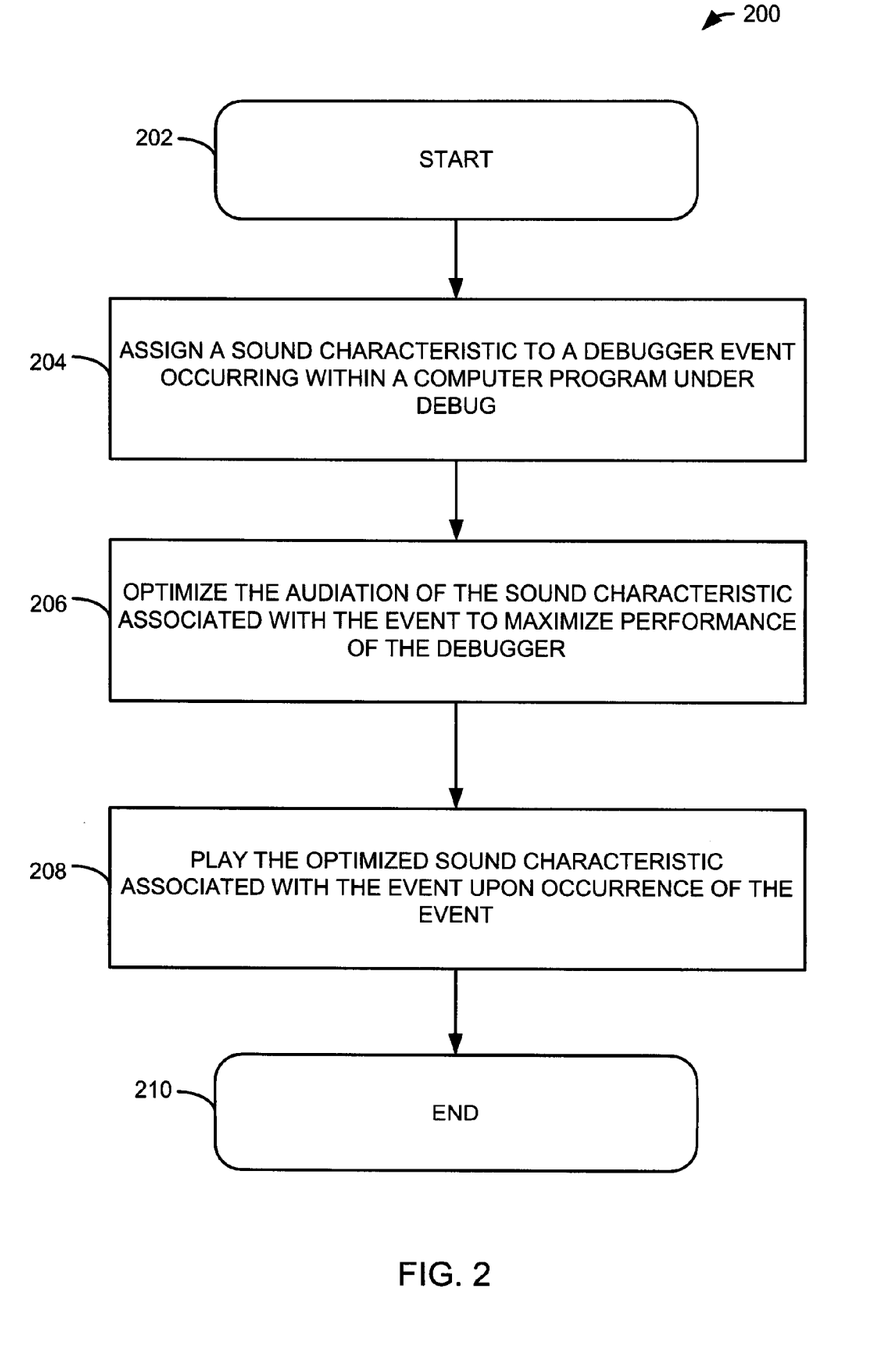
FIG. 2 is a flow diagram of a method in accordance with the embodiments of the present invention.

Referring to FIG. 2, a method 200 of audiating the occurrence of debugger events 126 within a software debugger in accordance with an embodiment of the present invention is provided. At block 202, the method begins. At block 204, the method assigns a sound characteristic to a debugger event (FIG. 1, 126) occurring within the computer program 123 under debug. Examples of debugger events 126 include, but are not limited to: encountering a line within a module of the computer program 123 while executing the computer program in debugger mode via the debugger 124; reaching a predefined breakpoint while executing the computer program 123 in debugger mode; monitoring a variable, counter or register for a value change while executing the computer program 123 in debugger mode; runtime library calls; monitoring when a user controlled screen pointer on the debugger screen passes over the name of a module on the screen, monitoring the amount of time spent editing each of the modules within the computer program 123 during debug edit mode; and determining when a single thread of execution turns into multiple threads of execution, and vice versa. This list of events is for illustrative purposes only, and it is anticipated that other types of debugger events 126 will occur which are consistent with the scope and spirit of the present invention.

A variety of sound characteristics (i.e. a sound hook) may be associated with a debugger event 126. Examples of sound characteristics include, but are not limited to: tone, pitch, timbre, volume, duration, chords, stereo channel, and text-to-speech. These characteristics may be associated with debugger events 126 automatically by the debugger 124 itself, or may manually be assigned by the user.

At block 206, the method next optimizes the audiation of the sound characteristic associated with the debugger event 126 to maximize performance of the debugger 124. For example, if during debug, a first sound hook is encountered, the present invention determines the duration of the sound hook. Upon resuming execution, if a second sound hook is encountered while the first sound hook is still playing, the second sound hook is removed, and the debugger execution continues. In this way, debugger 126 still offers audiation support, but the debugger's execution is not slowed by the need to play every sound hook encountered. This, in turn, optimizes the performance of the debugger. In another embodiment, the duration of the sounds played for each sound hook encountered may be shortened by the optimizer in order to optimize the performance of the debugger. For example, if the density of sounds hooks is disproportionately high within a particular code section under debug, the optimizer may shorten the duration of the sound hooks within that particular code section.

In another embodiment, a priority may be associated with each sound hook, such that if a second sound hook is encountered during the time when the first sound hook is playing, the playing of the second sound hook is removed only if the priority of the second sound hook is less than or equal to the priority assigned to the first sound hook. It is contemplated that other uses of the sound hook priority scheme may be employed within the present invention, and still remain within the scope and spirit of the invention.

At block 208, the method plays the optimized sound characteristic associated with the debugger event 126 event upon the occurrence of the debugger event. Debugger audiator (FIG. 1, 125) audiates the sound characteristic associated with the debugger event 126 via the audio interface 145 and one or more audio devices 146. The method ends at block 210.

Figure 3A:
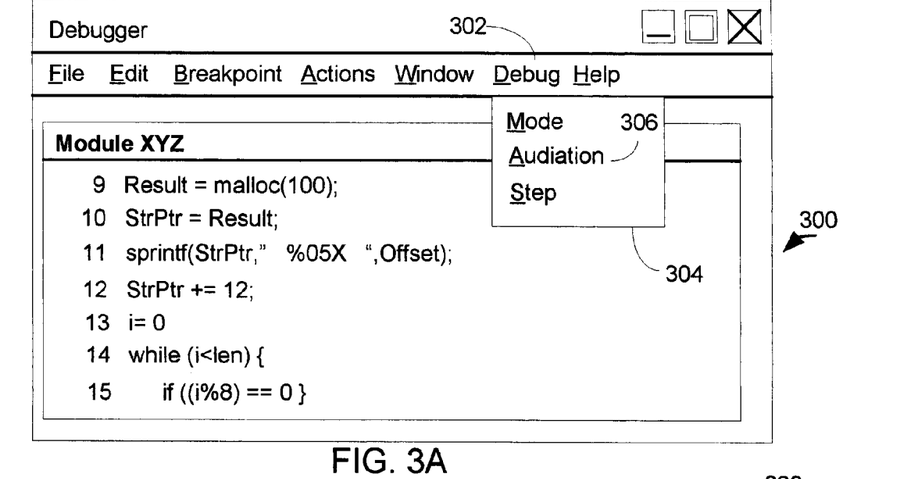
FIG. 3A illustrates a graphical user interface for a debugger, wherein a pull down menu option exists to bring up an audiation pop-up.

FIG. 3A illustrates a graphical user interface for a debugger, wherein an option exists to automatically audiate each line of each module within the computer program under debug, shown generally at 300. In the illustrated embodiment, when a user selects a "Debug" menu pulldown 302, a secondary menu 304 appears, including an option for "Audiation" 306. When the "Audiation" option is selected, a popup "Audiation" window 320 appears, as shown in FIG. 3B.

Figure 3B:
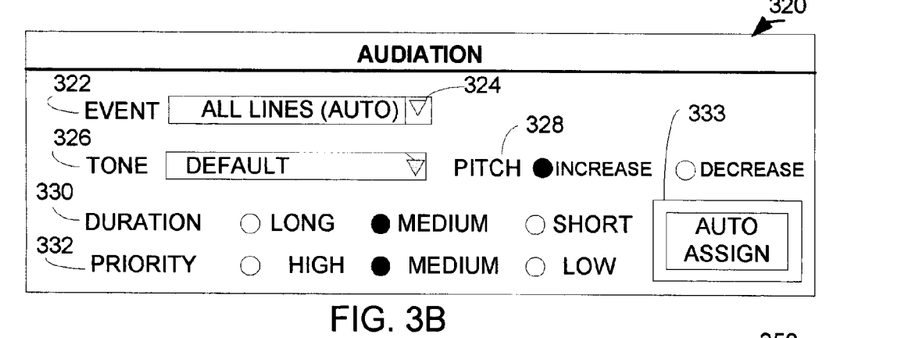
FIG. 3B illustrates the audiation pop-up menu, wherein the user has selected an event option to audiate each line within all program modules.

In FIG. 3B, a number of event options are offered to the user via a dropdown menu 324. In the illustrated embodiment, an option is selected to audiate each line within all program modules (i.e., "ALL LINES (AUTO)"), as shown at 324. When this option is selected, the "Audiation" window is adjusted to present options only relevant to the "ALL LINES (AUTO)" event option.

One of these selectable options allows the user to select a base tone to be used for the audiation within each module, as shown at 326. In the illustrated embodiment, the user has selected a "DEFAULT" tone to be assigned to each module. Note that the selection of "DEFAULT" will result in each program module receiving a different base tone. An option also exists to increase or decrease the pitch of the tone produced as debugger execution proceeds though lines within the modules, as shown at 328. An option also exists to control the duration of the tone produced when a line is encountered during debug, as shown at 330. Within this option, the execution speed of the debugger may be increased by choosing a shorter duration for the tone produced when a line is encountered during execution. An option exists to assign a priority to the tones produced during the auto assignment of sound hooks to the lines of the selected modules, as shown at 332. This option enables the user to select the tones to be audiated that are most important to the user, sometimes resulting in lower priority sounds not being audiated. Finally, an "Auto Assign" button 333 exists to automatically assign a sound characteristic (i.e., the sound produced by selecting the menu options above) to each line of each module within the computer program.

After the user selects "Auto Assign" button 333, audiator (FIG. 1, 125) within debugger 124 assigns the selected (or default) tone to each selected program module within the computer program 123 currently under debug. For each line encountered within each selected program module during debug execution, the pitch of the assigned tone is adjusted so that earlier lines have a higher pitch assigned to them, and the later lines have a lower pitch assigned, assuming the user has selected the "decrease" option of pitch 328. If the "increase" option of pitch 328 is selected, then the earlier lines have a lower pitch assigned to them, and the later lines have a higher pitch assigned. Thus, each line within each of the selected modules will have a sound characteristic (i.e., sound hook) associated with it such that when the line is encountered during the debug operation (i.e., the debugger event) the assigned sound characteristic is played. The goal of this operation is to provide the user with a sense of how program execution is proceeding.

Figure 3C:
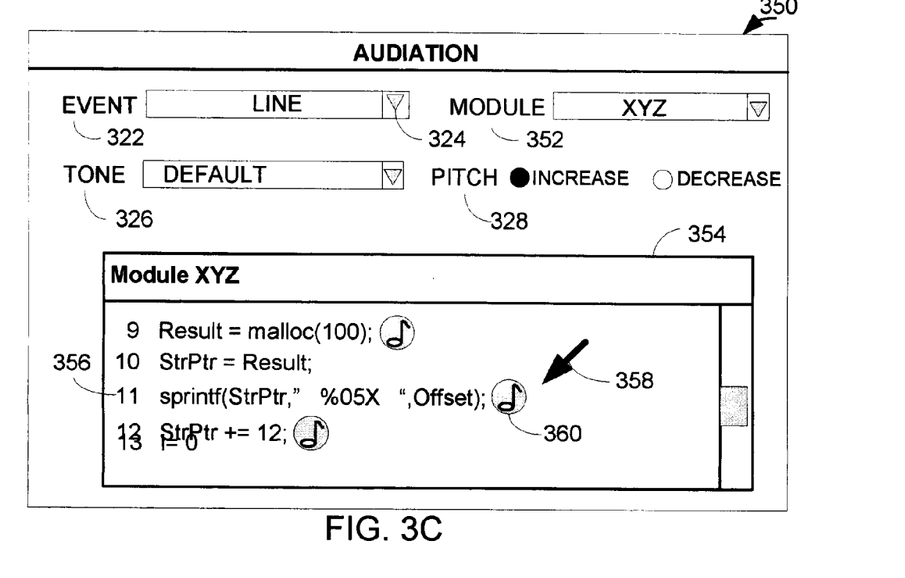
FIG. 3C illustrates the audiation pop-up menu, wherein the user has selected an event option to audiate only selected lines within selected program modules.

FIG. 3C illustrates the Audiation menu 350 presented to the user if the user selects to manually assign sound characteristics to selected modules/lines of modules within the program under debug, rather than having the present invention auto assign them, as shown previously in FIG. 3B. In this instance, the user selects the "Line" option from event option 322. The user will then be able to select one or more modules for insertion of sound characteristics, as shown at 352. For each module selected, the code for the module is displayed in a code display window 354. The user than can assign a tone to a selected line by moving a selection pointer 358 to a desired line 356 within the module, then clicking the mouse on the desired line. A line audiation indicator will then be shown next to the selected line, indicating that a sound characteristic has been assigned to the desired line. In contrast to the "auto assignment" of sound characteristics to every line of every module, as shown in FIG. 3B, the manual assignment of sound characteristics to lines as shown in 3C enables a user to more closely tailor the triggering of events at only selected locations within the program under debug.

Figure 4A:
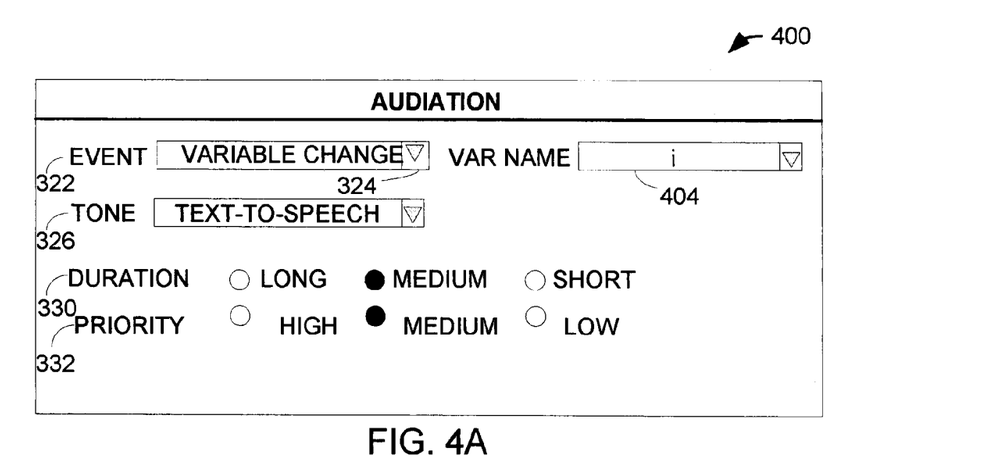
FIG. 4A illustrates the audiation pop-up menu, wherein the user has selected to audiate a variable change.

FIG. 4A illustrates an Audiation menu 400 presented to the user if the user selects a "variable change" event, as shown at 324. In this instance, a sound characteristic is assigned to one or more variables 404 within the program under debug, such that if a value of the selected variable(s) changes, a debugger event 126 is triggered, and the sound characteristic associated with the debugger event (i.e., a change to a specified variable) is played. In the illustrated example, a tone of "text-to-speech" has been chosen, as shown at 326. Thus, when a change occurs to the value of the selected variable 408, a text-to-speech message is audiated to the user (e.g., "The value of variable i has changed to 10"). In an alternative embodiment, an audio tone may be selected at tone option 326 instead of the text-to-speech choice. In this instance, the tone selected will be played when a change to one of the selected variables is encountered. Once again, options exist for the duration of the sound characteristic when the event is triggered, as shown at 330. Also, the priority of the variable change event may be controlled by the user at 332.

Figure 4B:
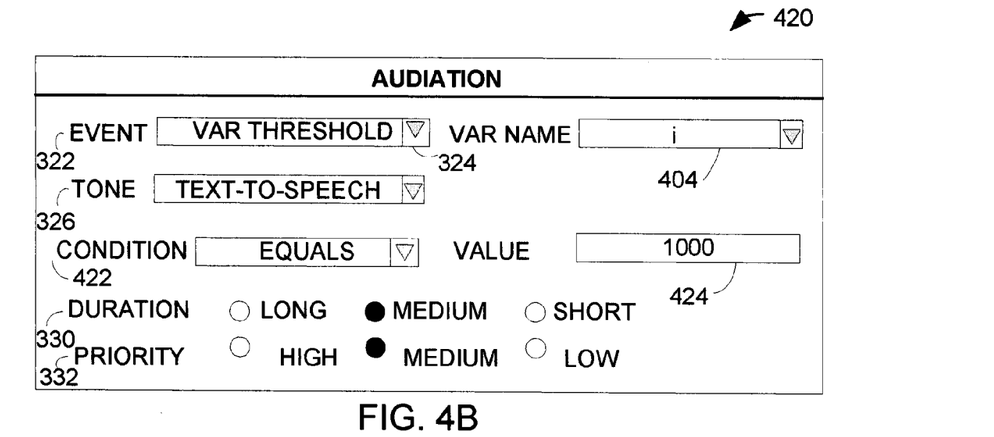
FIG. 4B illustrates the audiation pop-up menu, wherein the user has selected to audiate a value change event to a variable wherein the value change meets or exceeds a provided threshold value.

FIG. 4B illustrates an Audiation menu 420 presented to the user if the user selects a "variable threshold" event, as shown at 324. In this instance, a sound characteristic is assigned to one or more variables 404 within the program under debug, such that if the value of the selected variable(s) meets or exceeds a threshold value 424 supplied by a user, a debugger event 126 is triggered, and the sound characteristic associated with the debugger event (i.e., monitoring a variable for reaching or exceeding a threshold value) is played. For example, in the illustrated example, a text-to-speech tone has been specified at tone option 326. When a user supplied condition 422 occurs for the variable name(s) selected at 404, an event is triggered. In this case, if variable name "i" has a current value which equals 1000, a text-to-speech message is audiated to the user (e.g., "The value of variable i now equals user defined conditional value of 1000"). Several available conditional options 422 are available to the user, including, but not limited to: "equals", "less than", greater than", etc. In an alternative embodiment, an audio tone may be selected at tone option 326 instead of the text-to-speech choice. In this instance, the tone selected will be played when the value of selected variable i meets or exceeds the condition specified at condition option 422 and threshold value option 424. Once again, options exist for the duration of the sound characteristic when the event is triggered, as shown at 330. Also, the priority of the variable change may be controlled by the user at 332.

Figure 4C:
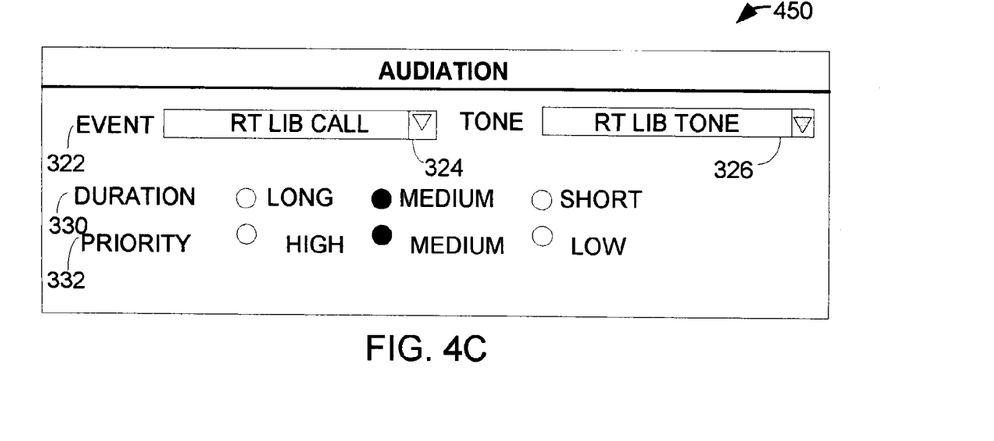
FIG. 4C illustrates the audiation pop-up menu, wherein the user has selected to audiate a run time library call event.

FIG. 4C illustrates the Audiation menu 420 presented to the user if the user selects to trigger a sound characteristic upon the occurrence of a "real-time library call" debugger event, as shown at 324. In the illustrated example, should a real time library call occur within the computer program, a special real time library tone will be assigned to the event, as shown at 326. An option exists for controlling the duration of the sound characteristic when the real-time library call debugger event is triggered, as shown at 330. Also a priority may be assigned to the real-time library call debugger event at priority option 332.

Figure 5A:
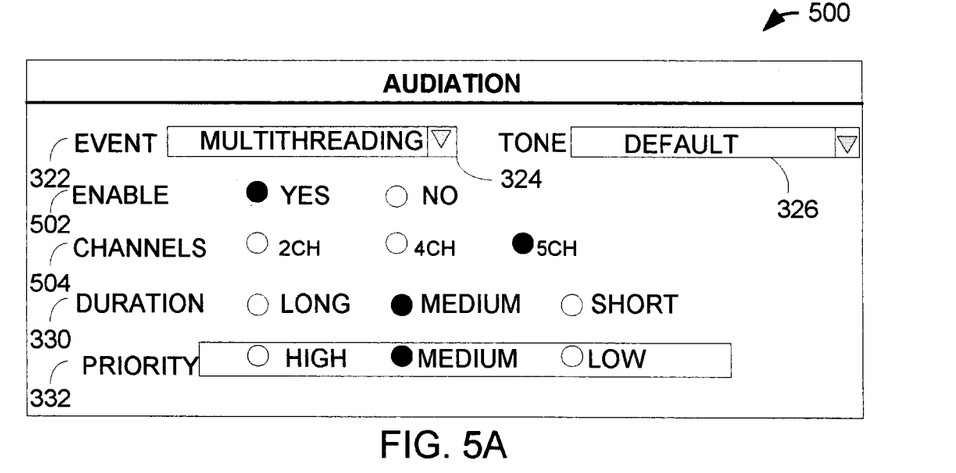
FIG. 5A illustrates the audiation pop-up menu, wherein the user has selected to audiate a multithreading event.

FIG. 5A illustrates the Audiation menu 500 presented to the user if the user selects to trigger a sound characteristic upon the occurrence of a "multithreading" debugger event, as shown at 324. This event option will be selectively enabled by selecting "Yes" at an enable option 502 of Audiation menu 500. A tone for the specified event is selected at option 326. In one embodiment, the number of simultaneous channels to be used for the occurrence of multithreading may be indicated at channel option 504. For example, selecting the "2CH" option will enable two threads to be simultaneously broadcast on the "left" and "right" channels of a stereo sound signal. If the hardware supports it, selecting the "4CH" option will enable four threads to be simultaneously broadcasting on the "left front", "left rear", "right front" and "right rear" audio channels. An "5CH" option also exists for enabling up to 5 threads to be simultaneously broadcasting on the "left front", "left rear", "right front" "right rear', and "front center" channels. An option exists for the duration of the sound characteristic when the multithreading event is triggered, as shown at 330. Also a priority may be assigned to the multithreading event at priority option 332. In this way, the multithreading event option enables the use of spatial separation between stereo channels to indicate simultaneous activity among multiple threads. This is useful in determining when a deadlock condition has occurred, and possibly where it started.

Figure 5B:
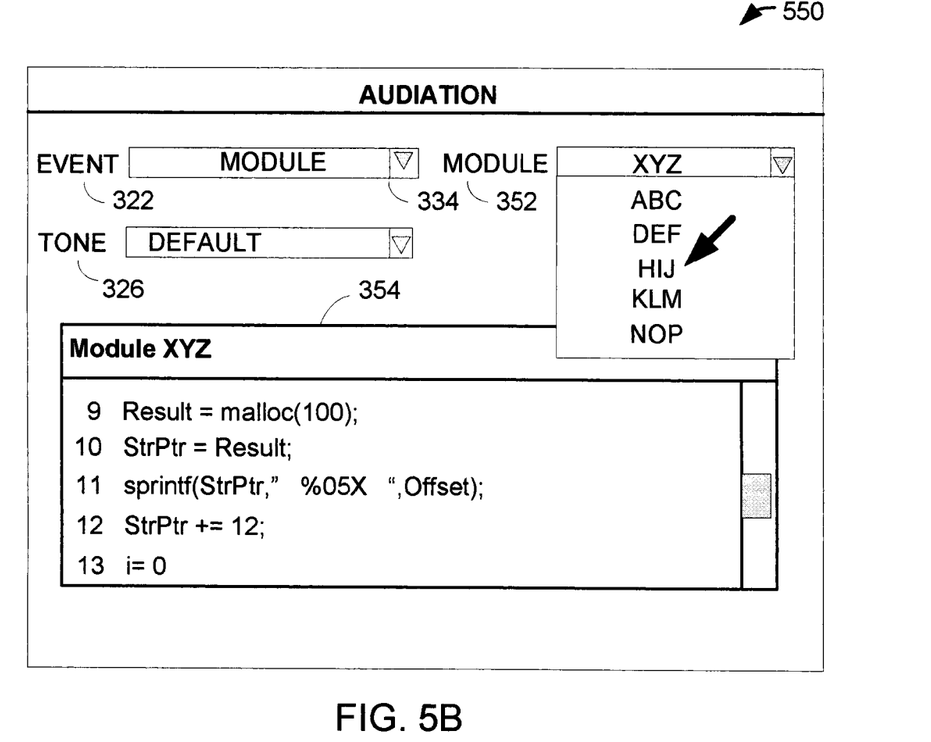
FIG. 5B illustrates the audiation pop-up menu, wherein the user has selected to audiate the event of mousing over module names.

FIG. 5B illustrates the Audiation menu 550 presented to the user if the user selects to trigger a sound characteristic upon the debugger event of mousing over a module name, as shown at 324. In this embodiment, when a user selects a module name from module option 352, the tone selected at tone option 326 is played. In this way, the user may be better able to associate the a playing during debug with a specific module name. When a user mouses over a specific module listed module option pulldown at 352, the code associated with the module is displayed at code display window 354 in addition to playing the associated sound characteristic for the module.

One embodiment of the present invention (not illustrated) may look at a call graph generated by the compiler or examine a historical sequence of module transitions to assign tones that are less likely to blend, thus making it easier for the user to hear module transitions.

In another embodiment (not illustrated), the present invention may take into account information provided by the editor program supplied with the IDE to determine what parts of the computer program under debug that the user was recently editing of spending time on with the debugger. In this case, the volume associated with these modules would be increased to that the user will be more easily recognize them.

In yet another embodiment (not illustrated), the present invention may look at a historic audiation and timing of sound hooks encountered and compare these characteristics with the characteristics of a library of songs to determine any songs where the sound hooks of the program under debug match up with the notes of the song. If a close match can be found, parts of the song corresponding to the sound hooks can be played in lieu of the sound hooks themselves, thus enabling the user to better recognize certain parts of the program under debug.

Audiating a computer program under debug in the ways shown in FIGS. 3, 4 and 5 above enables a user to hear the running program and identify patterns. For instance, when the program under debug loops and loads data, there will be one recognizable sound pattern, but when the program under debug transitions to processing the data, the pattern will change, and the user will know that something different is happening with the program under debug. If the program under debug gets stuck in a loop, the sound pattern will tend to be more monotonic, and the user would surmise that the program under debug is likely stuck. Similarly, if a program under debug is hung on an I/O request or lock, the sound may stop, again indicating to the user a high likelihood that the hang is due to the I/O request or lock. In one embodiment, the present invention could identify such a condition by having a text-to-speech hook associated with the I/O request or lock events, in order to identify I/O requests that take longer than a given amount of time.

Exemplary embodiments of the present invention are described largely in the context of a fully functional computer system for audiating the occurrence of debugger events within a software debugger. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of audiating an occurrence of a debugger events within a software debugger, the method comprising:
    assigning at least one sound characteristic to the debugger event occurring within the software debugger the assigning further comprising:
        monitoring an amount of time spent editing each module of a plurality of modules in a software program under debug; and
        automatically adjusting a volume of the at least one sound characteristic associated with each module of the plurality of modules during debug based on the amount of time spent editing each module of the plurality of modules;
    optimizing the audiation of the at least one sound characteristic associated with the debugger event to maximize performance of the software debugger, the optimizing further comprising:
        if a first sound hook is encountered during debug, determining an amount of time required to play the first sound hook;
        playing the first sound hook; and
        if a second sound hook is encountered during a time when the first sound hook is playing, pruning the playing of the second sound hook based on the amount of time required to play the first sound hook.

2. The method of claim 1 wherein the step of assigning at least one sound characteristic to the debugger event occurring within the software debugger further comprises:
    assigning a different tone to each module of the software program under debug;
    assigning a different pitch to each line within each module of the software program under debug; and
    associating a sound hook with each line within each module of the software program under debug such that the sound hook is played when each line is encountered during a debug operation.

3. The method of claim 2, wherein the method further includes the step of:
    associating a sound hook with each module of the plurality of modules such that when a user moves a screen pointer over the module in edit mode, the sound hook is played.

4. The method of claim 1 wherein the step of assigning at least one sound characteristic to the debugger event occurring within the software program under debug further comprises:
    associating a sound hook with a variable value used within the software program under debug such that if the variable value changes, the sound hook audiates the variable value change.

5. The method of claim 4, wherein the sound hook associated with the variable value residing within the software program under debug is a text-to-speech sound hook.

6. The method of claim 1 wherein the step of assigning at least one sound characteristic to the debugger event occurring within the software debugger further comprises:

associating a sound hook with a point of interest residing within the software program under debug such that if the point of interest is reached during a debug operation, the sound hook audiates the occurrence of the debugger event.

7. The method of claim 1, wherein the step of assigning at least one sound characteristic to the debugger event occurring within the software debugger further comprises:

if the software program under debug comprises multiple threads, associating each thread with a sound channel to indicate simultaneous activity among the multiple threads using spatial separation between the sound channels.

8. The method of claim 1, wherein the step of if a second sound hook is encountered during the time when the first sound hook is playing, pruning the playing of the second sound hook further comprises:

assigning a priority to the first sound hook and the second sound hook within the software program under debug;

if the second sound hook is encountered during the time when the first sound hook is playing, pruning the playing of the second sound hook only if the priority of the second sound hook is less than or equal to the priority of the first sound hook.

9. A debugger computer program product residing on a non-transitory computer readable media for implementing the audiation of an occurrence of a debugger event within a software debugger running on a computer system, said debugger computer program product including instructions executed by the computer system to cause the computer system to perform the steps of:

assigning at least one sound characteristic to the debugger event occurring within the software debugger, the assigning further comprising:

monitoring an amount of time spent editing each module of a plurality of modules in a software program under debug; and automatically adjusting a volume of the at least one sound characteristic associated with each module of the plurality of modules during debug based on the amount of time spent editing each module of the plurality of modules;

optimizing the audiation of the at least one sound characteristic associated with the debugger event to maximize performance of the software debugger, the optimizing further comprising:

if a first sound hook is encountered during debug, determining an amount of time required to play the first sound hook;

playing the first sound hook; and if a second sound hook is encountered during a time when the first sound hook is playing, pruning the playing of the second sound hook based on the amount of time required to play the first sound hook.

10. The debugger computer program product as recited in claim 9, wherein the step of assigning at least one sound characteristic to the debugger event occurring within the software debugger further comprises:

assigning a different tone to each module of the software program under debug;

assigning a different pitch to each line within each module of the software program under debug; and associating a sound hook with each line within each module of the software program under debug such that the sound hook is played when each line is encountered during a debug operation.

11. The debugger computer program product as recited in claim 10 further including the step of:

associating a sound hook with each module of the plurality of modules such that when a user moves a screen pointer over the module in edit mode, the sound hook is played.

12. The debugger computer program product as recited in claim 9, wherein the step of assigning at least one sound characteristic to the debugger event occurring within the software debugger further comprises:

associating a sound hook with a variable value residing within the software program under debug such that if the variable value changes, the sound hook audiates the variable value change.

13. The debugger computer program product as recited in claim 12, wherein the sound hook associated with the variable value residing within the software program under debug is a text-to-speech sound hook.

14. The debugger computer program product as recited in claim 9, wherein the step of assigning at least one sound characteristic to the debugger event occurring within the software debugger further comprises:

associating a sound hook with a point of interest residing within the software program under debug such that if the point of interest is reached during the debug operation, the sound hook audiates the occurrence of the debugger event.

15. The debugger computer program product as recited in claim 9, wherein the step of assigning at least one sound characteristic to the debugger event occurring within the software debugger further comprises:

if the software program under debug comprises multiple threads, associating each thread with a sound channel to indicate simultaneous activity among the multiple threads using spatial separation between stereo channels.

16. The debugger computer program product as recited in claim 9, wherein the step of assigning at least one sound characteristic to the debugger event occurring within the software program under debug further comprises:

assigning a priority to the first sound hook and the second sound hook within the software program under debug;

if the second sound hook is encountered during the time when the first sound hook is playing, pruning the playing of the second sound hook only if the priority of the second sound hook is less than or equal to the priority of the first sound hook.

* * * * *